March 1, 1932.  E. H. FORD  1,847,606
METER MOUNTING
Filed Feb. 13, 1931
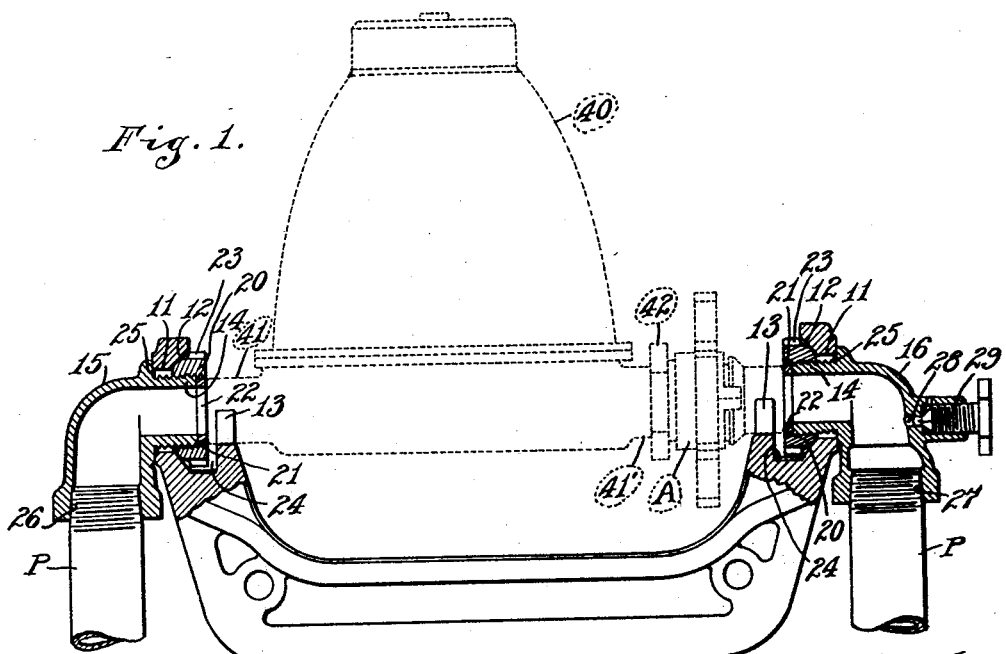
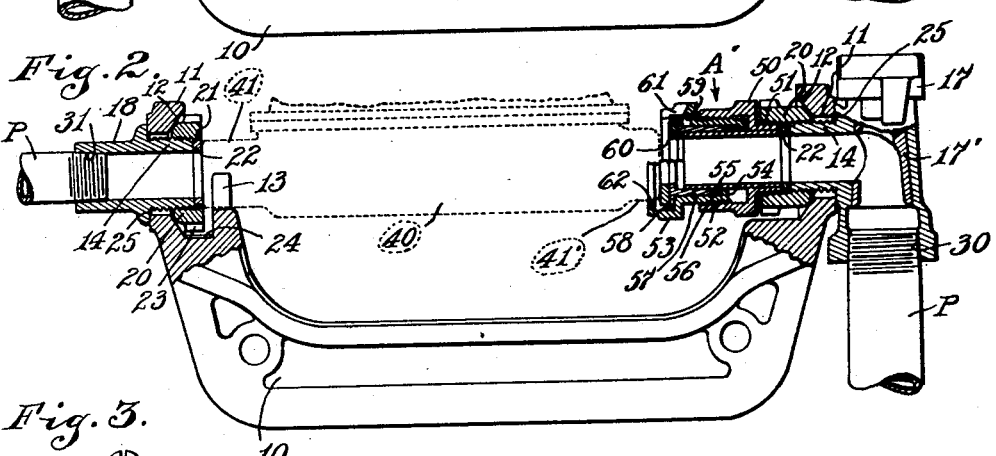
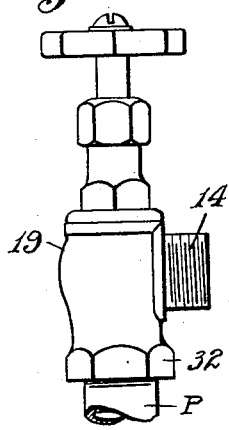
Inventor
Edwin H. Ford,
By Hood & Hahn.
Attorneys Patented Mar. 1, 1932

1,847,606

UNITED STATES PATENT OFFICE

EDWIN H. FORD, OF WABASH, INDIANA, ASSIGNOR TO FORD METER BOX COMPANY, OF WABASH, INDIANA, A CORPORATION OF INDIANA

METER MOUNTING

Application filed February 13, 1931. Serial No. 515,451.

The object of my invention is to provide improved means which may be incorporated in a fluid supply line by which a meter may be readily inserted into or withdrawn from such supply line, the construction being such that with a minimum number of fittings any desired or necessary arrangement of the piping will not interfere with a proper positioning of the meter for ready reading and necessary or desirable elements for controlling or testing the flow of fluid through the supply line may be readily attained.

The accompanying drawings illustrate my invention.

Fig. 1 is an axial section of an embodiment of my invention, the meter, and the adapter for removably clamping the meter in place being indicated in dotted lines;

Fig. 2 an axial section of another embodiment of my invention, and

Fig. 3 an elevation of a convenient fitting forming part of my improved equipment.

In the drawings 10 indicates a cast iron U-shaped yoke, each arm of which is provided with an eye 11, the two eyes being in axial alignment and each eye being preferably counter-bored at its inner end, as indicated at 12. Associated with one or both of the eyes 11, but laterally spaced therefrom, is a crotched finger 13, the purpose of which will appear.

Each eye 11 is bored to receive the threaded tubular shank 14 of one or another fitting 15, 16, 17, 18, 19, the opposite end of each of which is formed to receive or be associated with standard piping P of the fluid supply line.

Associable with either one of the shanks 14 is a nut 20, one end of which is formed for abutting cooperation with the counter-bore 12 of an eye 11 and the axial length of which is sufficient to form a pocket 21 for the reception of a packing gasket 22 abutting the end of shank 14. The nut 20 has a polygonal flange 23 by which it may be readily manipulated and the axial length of the nut is such that the flange 23 may lie in the notch 24, between eye 11 and finger 13.

Each shank 14 is preferably, though not necessarily, subtended by a shoulder 25 which may be drawn against the outer face of the eye by the nut 20.

The fitting 15 is a tubular L, most conveniently a ninety degree turn, internally threaded at its outer end 26 for the reception of pipe P.

The fitting 16 is a ninety degree L threaded at its outer end 27 to receive a pipe P and provided with a by-pass 28 controlled by a valve 29, the arrangement being such that, by opening valve 28, a small flow of fluid may be established from the supply line with which to test the operativeness of the meter.

The fitting 17 comprises a casing threaded at its outer end 30 for the reception of pipe P and having a tubular plug valve 17' by means of which the flow of fluid may be blocked in the line.

The fitting 18 is a straight tubular fitting threaded at its outer end 31 for the reception of pipe P.

The fitting 19 is a globe valve threaded at its outer end 32 for the reception of pipe P.

The meter 40 is of well-known form provided at each end with tubular spuds 41, 41', one of which may be externally threaded for the reception of the internally-threaded nut 42, of an adapter A of well-known form by means of which the meter may be readily inserted between two fittings carried by the opposed eyes 11, 11 of the yoke 10 and readily relieved therefrom.

The adapter A', shown in Fig. 2, comprises a nut 50 externally threaded at 51 for insertion into nut 20 and for abutment against the gasket 22. The opposite end of nut 50 is internally threaded at 52 to receive the externally threaded end of a nut 53 provided at its inner end with an internal flange 54 which embraces a sleeve 55 integral with or brazed within nut 50, said flange forming an abutment for a packing gasket 56 packing against sleeve 55 and compressible by means of a sleeve 57 slidable within nut 53, said sleeve 57 being removably held in place by a spring retainer 58 seated in a circumferential groove 59 formed within the bore of nut 53. Sleeved within nut 53 and abutting against the outer end of sleeve 57 is a packing gasket 60. The wall of nut 53 is notched at 61 deeply enough to expose gasket 60 and retainer 58 to facilitate ready removal thereof. Gasket 60 is thin enough to leave a short portion 62 of the end of nut 53 unoccupied for the reception of the end of one of the spuds of the meter, thus taking the place of one of the crotched fingers 13 of yoke 10 so that, as indicated in Fig. 2, one of these crotched fingers may be omitted from the yoke.

In use yoke 10 will have associated with its opposite ends those fittings which will be best adapted for association with the adjacent ends of the piping P, dependent upon the exigencies of the particular installation, the nuts 20, associated with such fittings, serving to retain said fittings in the yoke with the inner ends thereof properly spaced for the insertion of the meter and adapter so that, by manipulation of the adapter, the outer end of the adapter and the end of the opposite spud of the meter may be forced into firm contact with the adjacent gaskets 22, the nuts 20 of the opposed fittings transmitting the thrust to the eyes of the yoke and associating the meter in a fluid-tight relationship with the piping.

It will be noted that the fundamental characteristic of the above-described equipment is that the threaded shanks 14 of the various fittings (which at their opposite ends are formed for direct association with standard piping), may be projected inwardly through the eyes 11 of the yoke 10 and may occupy any desired angular relationship with said yoke, and that these fittings are then equipped to receive the thrust produced by the expansion of the adapter, by the nuts 20 threaded upon the fingers 14 and abutting the inner faces of the eyes 11.

The crotched fingers 13 serve as seats to support the meter in alignment with the fittings while the meter is being clamped in operating position by means of the adapter.

The adapter A', instead of being attached to one spud of the meter, as is adapter A in Fig. 1, is attached to the shank 14 of one of the fittings and, if the meter is to be removed to discontinue service, this adapter A' may be also removed so as to make it more difficult for the customer to insert a connection between the two fittings carried by the yoke.

I claim as my invention:—

1. A meter mounting comprising a yoke having aligned eyes, pipe-receiving fittings having threaded shanks projected inwardly through said eyes, and thrust-receiving nuts threaded upon the inner ends of said shanks and abutting the inner faces of the eyes.

2. A meter mounting comprising a yoke having an eye, a pipe-receiving fitting having a threaded shank projected inwardly through said eye, a thrust-receiving nut threaded upon the end of said shank and abutting the inner face of the eye, an adapter comprising a nut having a threaded shank projected into the inner end of the thrust-receiving nut and abutting the inner end of the threaded shank, a third nut threaded into the inner end of the second nut, and means associated with said second and third nuts for producing a fluid-tight joint between the second and third nuts.

3. An adapter for meter mountings comprising a nut having an externally threaded end and an internal sleeve, a second nut thread-associated with the first nut and provided with an internal flange, a packing gasket abutting said flange and capable of circumferential contact with the sleeve of the first nut, and a pressure sleeve mounted in the second nut with its inner end engageable with said gasket.

4. A meter mounting comprising a yoke having an eye at one end, a pipe-receiving fitting having a threaded shank projected inwardly through said eye, and a thrust-receiving nut threaded upon said shank and abutting the inner face of the eye.

In witness whereof, I have hereunto set my hand at Wabash, Indiana, this 10th day of February, A. D. one thousand nine hundred and thirty-one.

EDWIN H. FORD.